(12) United States Patent
Wahlström (10) Patent No.: US 11,603,785 B2
(45) Date of Patent: Mar. 14, 2023

(54) EXHAUST AFTERTREATMENT UNIT FOR CLEANING EXHAUST GASES

(71) Applicant: VOLVO TRUCK CORPORATION, Gothenburg (SE)

(72) Inventor: Gert-Ove Wahlström, Askim (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/654,335

(22) Filed: Mar. 10, 2022

(65) Prior Publication Data

US 2022/0307400 A1 Sep. 29, 2022

(30) Foreign Application Priority Data

Mar. 25, 2021 (EP) .................................... 21164780

(51) Int. Cl.
| | |
|---|---|
| *F01N 3/20* | (2006.01) |
| *B01D 53/94* | (2006.01) |
| *F01N 3/035* | (2006.01) |
| *F01N 3/10* | (2006.01) |
| *F01N 13/00* | (2010.01) |

(52) U.S. Cl.
CPC ....... *F01N 3/2013* (2013.01); *B01D 53/9418* (2013.01); *B01D 53/9431* (2013.01); *B01D 53/9477* (2013.01); *F01N 3/035* (2013.01); *F01N 3/105* (2013.01); *F01N 3/2066* (2013.01); *F01N 13/0093* (2014.06);
(Continued)

(58) Field of Classification Search
CPC ...... F01N 3/2013; F01N 3/035; F01N 3/2066; F01N 13/009; F01N 2240/16; F01N 2450/30; F01N 2590/08; F01N 3/027; F01N 3/105; B01D 53/9418; B01D 53/9477

USPC ........................................................ 60/320
See application file for complete search history.

(56) References Cited

U.S. PATENT DOCUMENTS

| | | |
|---|---|---|
| 8,082,732 B2 | 12/2011 | Nefischer |
| 9,617,895 B2 | 4/2017 | Mueller-Haas et al. |

(Continued)

FOREIGN PATENT DOCUMENTS

| | | |
|---|---|---|
| DE | 102005063081 A1 | 7/2007 |
| DE | 102015201193 B3 | 6/2016 |

(Continued)

OTHER PUBLICATIONS

European Search Report dated Sep. 22, 2021 in corresponding European Patent Application No. 21164780.5, 6 pages.

(Continued)

*Primary Examiner* — Anthony Ayala Delgado
(74) *Attorney, Agent, or Firm* — Venable LLP; Jeffri A. Kaminski (57) ABSTRACT

An exhaust aftertreatment unit for cleaning exhaust gases. The exhaust aftertreatment unit includes an emission reducing module being a diesel particulate filter, DPF, and/or a diesel oxidation catalyst, DOC, a selective catalyst reduction, SCR, catalyst, an electrical heating element arranged upstream of the SCR catalyst, a casing housing at least the emission reducing module, and a service lid removably arranged to cover a service opening of the casing through which the emission reducing module may be accessed. The electrical heating element is removably arranged relative the casing and is arranged accessible upon removal of the service lid.

14 Claims, 6 Drawing Sheets

(52) U.S. Cl.
CPC ........ *B01D 53/944* (2013.01); *F01N 2610/02* (2013.01); *F01N 2610/102* (2013.01); *F01N 2610/1453* (2013.01)

(56) References Cited

U.S. PATENT DOCUMENTS

| | | | |
|---|---|---|---|
| 10,253,670 B2 * | 4/2019 | Werni | F01N 3/0211 |
| 10,358,961 B2 * | 7/2019 | Inoue | F01N 3/208 |
| 2011/0000194 A1 * | 1/2011 | Gonze | F01N 3/103 60/297 |
| 2011/0047974 A1 | 3/2011 | Henry et al. | |
| 2011/0131950 A1 * | 6/2011 | Parnin | F01N 9/002 60/274 |
| 2013/0118157 A1 | 5/2013 | Kruse et al. | |
| 2014/0154139 A1 | 6/2014 | Van Niekerk et al. | |
| 2015/0152766 A1 | 6/2015 | Brunel | |
| 2016/0194991 A1 | 7/2016 | Clayton, Jr. et al. | |
| 2018/0216511 A1 * | 8/2018 | Yamashita | F01N 3/035 |
| 2018/0334940 A1 | 11/2018 | Calvo | |
| 2019/0383189 A1 * | 12/2019 | Dou | F01N 3/2066 |
| 2019/0383190 A1 | 12/2019 | Stock et al. | |
| 2020/0291839 A1 * | 9/2020 | Lambert | F01N 3/0807 |
| 2021/0003056 A1 | 1/2021 | Huang et al. | |
| 2021/0301700 A1 * | 9/2021 | Brahma | F01N 3/021 |
| 2021/0404362 A1 * | 12/2021 | Salemme | F02B 39/10 |

FOREIGN PATENT DOCUMENTS

| | | | | |
|---|---|---|---|---|
| DE | 102016223578 A1 | | 5/2018 | |
| EP | 1484481 A1 * | | 12/2004 | ............ F01N 13/14 |
| EP | 3139009 A1 | | 3/2017 | |
| EP | 3208436 A1 | | 8/2017 | |
| EP | 3757361 A1 | | 12/2020 | |
| FR | 3072123 A1 | | 4/2019 | |
| JP | 2005155404 A | | 6/2005 | |
| JP | 2019094878 A | | 6/2019 | |

OTHER PUBLICATIONS

European Search Report dated Sep. 1, 2021 in corresponding European Patent Application No. 21164781.3, 8 pages.
Dfficial Action dated Oct. 12, 2022 in related U.S. Appl. No. 17/654,338, 18 pages.
Office Action dated Jan. 6, 2023 in related U.S. Appl. No. 17/654,338, 17 pages.

* cited by examiner

EXHAUST AFTERTREATMENT UNIT FOR CLEANING EXHAUST GASES

The present invention relates to an exhaust aftertreatment unit for cleaning exhaust gases. The invention further relates to a method for handling an exhaust aftertreatment unit for a vehicle, to an electrical heating element for use in exhaust aftertreatment unit, and to a vehicle comprising an exhaust aftertreatment unit.

BACKGROUND

A vehicle typically comprises an engine for propelling the vehicle. The engine may be powered by various means, such as e.g. by liquid or gaseous fuel in an internal combustion engine, or by electric power in an electric machine. Moreover, hybrid solutions exist in which the vehicle is propelled both by an internal combustion engine and an electric machine.

In case the engine is a combustion engine, such as a diesel engine, it is common to provide the vehicle with an exhaust aftertreatment system, EATS, to handle emissions from the engine. An EATS for a diesel engine typically includes a diesel oxidation catalyst, DOC, a diesel particulate filter, DPF, and a selective catalytic reduction SCR catalyst. A reductant, such as urea or an ammonia comprising substance, is injected upstream of the SCR catalyst to assist in converting nitrogen oxides, also referred to as NOx, with the aid of a catalyst into diatomic nitrogen, N2, and water, and potentially carbon dioxide CO2 (depending on the choice of the reductant). The cleaned, or at least emission reduced, exhaust gases then leaves the EATS and the vehicle through the tailpipe of the vehicle. Other types of engines causing similar emissions as the diesel engine may utilize the same, or a similar, EATS.

Government regulations, together with a constant demand for increased fuel economy of the vehicle, implies a need for a more efficient operation of the EATS. For example, the EATS must heat up fast and have a high conversion efficiency also at very low loads when the temperature of the exhaust gases is low. The need of very efficient engines for meeting stringent CO2-requirements also leads to lower temperature of the exhaust gases and higher engine out NOx-levels which requires large amounts of reductant to be injected upstream the SCR catalyst. Furthermore, when using urea as the reductant, the urea requires heat to evaporate and hydrolize into ammonia. If the temperature is low, there is a large risk for creating crystallization and deposits that reduce the effect of the EATS.

Electrical heating elements may be used to heat the exhaust gases to counteract the low temperature of the exhaust gases and reduce the associated disadvantages. However, the addition of electrical heating elements to the EATS increase the complexity of the system, and/or add components that risk being subject to failure and in need of maintenance or exchange. Failure of components in the EATS often requires time consuming servicing with costly downtime of the vehicle. Moreover, component failure which leads to component exchange, or even exchange of the complete EATS, is bad for the environment.

Thus, there is a need in the industry for an improved EATS aiming to alleviate the above-mentioned drawbacks.

SUMMARY

It is an object of the present invention to at least partly alleviate the shortcomings discussed above in relation to known exhaust aftertreatment system, and provide an improved exhaust aftertreatment unit.

According to a first aspect of the present invention, an exhaust aftertreatment unit for cleaning exhaust gases is provided. The exhaust aftertreatment unit comprising:
 an emission reducing module being a diesel particulate filter, DPF, and/or a diesel oxidation catalyst, DOC,
 a selective catalyst reduction, SCR, catalyst,
 an electrical heating element arranged upstream of the SCR catalyst,
 a casing housing at least the emission reducing module, and
 a service lid removably arranged to cover a service opening of the casing through which the emission reducing module may be accessed,
 wherein the electrical heating element is removably arranged relative the casing and is arranged accessible upon removal of the service lid.

Hereby, the electrical heating element is easily accessible in the exhaust aftertreatment unit, and may be subject to maintenance or exchange. Thus, an exhaust aftertreatment unit which alleviates the shortcomings of low temperatures of the exhaust gases by means of the electrical heating element, but which has a simple configuration enabling easy access to the electrical heating element is provided. Thus, an improved exhaust aftertreatment unit is provided with a highly efficient removal of emission of the exhaust gases owing at least to the heating of the exhaust gases by the electrical heating element, while reducing the additional complexity of the electrical heating element as it is easily accessible upon removal of the service lid.

According to at least one example embodiment, the electrical heating element is arranged inside the casing, and may be removed relative the casing by being passed through the service opening, or is arranged inside the service lid, and may be removed relative the casing by removing the service lid. In the latter case, the electrical heating element may e.g. be accessed through an orifice or an accessible side of the service lid. Thus, during use, the casing or the service lid houses the electrical heating element. Hereby, the electrical heating element may be easily accessible e.g. via the service opening or via the removed service lid. For example, maintenance may be performed on the electrical heating element via the service opening or via the removed service lid. According to at least one example embodiment, the electrical heating element may be removed from the casing e.g. by being passed through the service opening and/or by being removed from the service lid, for maintenance and/or for exchanging the component. That is, the service lid may combine the function of being a service lid for both the electrical heating element and the emission reducing module.

The emission reducing module is a diesel particulate filter, DPF, i.e. being configured to remove particles, such as diesel particulate matter or soot, from the exhaust gases and/or is a diesel oxidation catalyst, DOC arranged and configured to convert carbon monoxide and hydrocarbons into carbon dioxide. Thus, according to at least one example embodiment, the emission reducing module is a combined DPF/DOC, for example in which the DOC is arranged upstream of the DPF. According to at least one example embodiment, the emission reducing module is a DPF. According to at least one example embodiment, the emission reducing module is a DOC.

According to at least one example embodiment, the emission reducing module, i.e. the DPF and/or DOC, is removably arranged inside the casing and may be passed through the service opening upon removal of the service lid. It should be noted that the emission reducing module may comprise a stationary member being integrated and firmly attached to the casing, and an insert member which is removably arranged in the stationary member. For such embodiments, the insert member is removably arranged inside the casing and may be passed through the service opening upon removal of the service lid. Thus, throughout the present description, the emission reducing module may refer to the emission reducing module, or the insert member of the emission reducing module.

It should be understood that the electrical heating element is a heating element which is configured to be heated by means of electricity. According to at least one example embodiment, the electrical heating element comprises a coil, or a plate, configured to be heated by electricity led through the coil, or plate. Thus, the electrical heating element may be arranged such that, during use, the exhaust gases are heated by passing circumferentially through the coil, or by passing across the coil or plate. The electrical heating element may be of another shape, e.g. in the shape of a flat or curved heating lamella, or comprise a heating element of a different type, e.g. a resistance foam. According to at least one example embodiment, the electrical heating element is a Positive Temperature Coefficient, PTC, based element. According to at least one example embodiment, the electrical heating element is based on induction heating and may be referred to as an induction heating element.

Thus, during use, exhaust gases are flowing through the exhaust aftertreatment unit and guided to pass the electrical heating element whereby the exhaust gases are heated by the electrical heating element. The electrical heating element typically comprises a heating surface arranged in the fluid pathway of the exhaust aftertreatment unit such that, in use, the exhaust gases in the fluid pathway flows over or across the heating surface.

According to at least one example embodiment, the exhaust aftertreatment unit further comprises an injector configured to inject a reductant for providing ammonia to the SCR catalyst, wherein the electrical heating element is arranged upstream of the injector.

Hereby, the electrical heating element may heat the exhaust gases passing the electrical heating element, whereafter the heated exhaust gases will heat the injected reductant. Thus, the reductant may be hydrolyzed into ammonia.

According to at least one example embodiment, the electrical heating element is arranged upstream in the vicinity of the injector. Thus, during use, the electrical heating element is heating the exhaust gases just prior to encountering the position for the injected reductant, whereby the provided heat from the electrical heating element heats the injected reductant. For example, the electrical heating element is arranged within 0.1 to 1.5 m, or 0.1 to 1 m, or 0.1 to 0.5 m of the injector. The distance being the flow path distance between the electrical heating element and the injector.

According to at least one example embodiment, the reductant is at least one of the following: anhydrous ammonia, aqueous ammonia, urea, aqueous urea and a diesel exhaust fluid. According to at least one example embodiment, the reductant is urea or liquid urea, hereafter commonly referred to as urea. The electrical heating element may thus, via the heated exhaust gases, provide the urea with the required heat to evaporate and be hydrolized into ammonia. Depending on the operating power of the electrical heating element, the heated exhaust gases may additionally heat up the SCR catalyst.

According to at least one example embodiment, the exhaust aftertreatment unit comprises a controller configured to control the introduction of reductant into the fluid pathway of the exhaust gases as a function of various exhaust gas parameters, such as NOx, temperature and pressure, for the purpose of controlling NOx concentration in exhaust gases. The exhaust gas parameters may be measured by various sensors at various locations in the exhaust aftertreatment unit. For example, NOx sensors may be located at, or proximate, the inlet and outlet of the exhaust aftertreatment unit. Temperature sensors, and/or pressure sensors, may be located before and after the electrical heating element, or the SCR catalyst.

According to at least one example embodiment, the electrical heating element is attached to the service lid and is removably arranged relative the casing together with the service lid, or is attached to the emission reducing module and is removably arranged relative the casing together with the emission reducing module.

Hereby, the electrical heating element may easily be subject to maintenance or exchange, e.g. by being passed through the service opening or through an orifice of the service lid. Moreover, by such arrangement of the electrical heating element, the electrical heating element will be arranged in the vicinity of the service lid so that it becomes accessible through the service opening, and/or through an orifice of the service lid.

According to at least one example embodiment, the casing is arranged to house the electrical heating element. Thus, the electrical heating element is removably arranged relative the casing by being removably attached inside of the casing. According to at least one example embodiment, the service lid is arranged to house the electrical heating element. Thus, the electrical heating element is removably arranged relative the casing together with the service lid. It should be noted the casing may be arranged to house the electrical heating element, or possibly house the electrical heating element together with the service lid, even though the electrical heating element is attached to the service lid as the electrical heating element may be attached to an external surface of the service lid and arranged to extend into the interior of the casing, an external surface of the service lid being referred to as a surface facing away from an interior of the service lid.

According to at least one example embodiment, the service lid comprises at least two external surfaces, a first external surface configured to face the interior of the casing, and a second external surface configured to face away from the interior of the casing. That is, when the service lid is attached to the casing and covers the service opening, the first external surface is arranged to face the interior of the casing, and the second external surface is arranged to face away from the interior of the casing. For the embodiment in which the electrical heating element is attached to the service lid, the electrical heating element is preferably attached to the first external surface of the service lid. Hereby, the electrical heating element is configured to face, and possibly extend into, the interior of the casing.

According to at least one example embodiment, the electrical heating element is removably attached to the service lid. Hereby, the electrical heating element can be detached from the service lid and be subject to maintenance or exchange.

According to at least one example embodiment, the emission reducing module comprises at least two opposite end portions, a first end portion configured to face the service lid, and a second end portion arranged opposite to the first end portion. That is, when the emission reducing module is arranged inside the casing, the first end portion is arranged to face the service lid, and the second end portion is arranged upstream of the first end portion. For the embodiment in which the electrical heating element is attached to the emission reducing module, the electrical heating element is preferably attached to the first end portion of the emission reducing module. Hereby, the electrical heating element is configured to face the service lid, and is arranged inside, the interior of the casing. Stated differently, during use, the emission reducing module comprises an inlet portion for receiving exhaust gases, and an outlet portion arranged downstream of the inlet portion to discharge the exhaust gases from the emission reducing module, wherein the outlet portion is arranged to face the service lid, and wherein the electrical heating element is attached to, or at, the outlet portion.

According to at least one example embodiment, the electrical heating element is removably attached to the emission reducing module. Hereby, the electrical heating element can be detached from the emission reducing module and be subject to maintenance or exchange.

According to at least one example embodiment, for which the electrical heating element is attached to the service lid, the service lid comprises a fluid channel portion defining at least a portion of the fluid pathway of the exhaust gases flowing through the exhaust aftertreatment unit.

Thus, the channel portion may extend the flow path of the exhaust gases.

Moreover, as the service lid is removably arranged relative the casing, the service lid and the fluid channel portion therein can be removed from the casing and be subject to maintenance. The electrical heating element may be arranged in the fluid channel portion of the service lid.

According to at least one example embodiment, the injector is attached to the service lid.

Thus, the service lid may comprise the fluid channel portion and the injector. For example, the injector is arranged in the service lid, or is integrally arranged to the service lid. Thus, the channel portion may extend the flow path for the injected reductant and increase the likelihood of an even heat distribution within the fluid pathway.

According to at least one example embodiment, the electrical heating element is configured to be powered via an electrical connection, wherein the electrical connection is extending at least through an external surface of the service lid.

Hereby, the electrical connection is arranged close to the service opening through which the electrical heating element is to be accessed. Thus, unnecessary wiring can be avoided and the electrical connection to the electrical heating element be made relatively easily.

As previously mentioned, the service lid may comprise first and second external surfaces. For such embodiments, the electrical connection is preferably extending through at least the second external surface of the service lid. Hereby, electrical power may be transferred from outside of the exhaust aftertreatment unit to the electrical heating element.

According to at least one example embodiment, the electrical connection is extending through the service lid. For example, the electrical connection may extend through the first and second external surfaces of the service lid. Such electrical connection is preferred for the embodiment in which the electrical heating element is attached to the service lid, such as being attached to the first external surface of the service lid, and/or for the embodiment in which the electrical heating element is attached to the emission reducing module, such as being attached to the first end portion of the emission reducing module. According to at least one example embodiment, the electrical connection is integrated into the service lid.

According to at least one example embodiment, the electrical connection is releasably mounted to the service lid.

Such embodiment is particular advantageous for the embodiment in which the electrical heating element is attached to the emission reducing module, as the electrical connection may be detached, or loosened, from the service lid before the service lid is removed from the casing. According to at least one example embodiment, the electrical connection may comprise a threaded section configured to be threadedly connected to a corresponding threaded section of the service lid.

According to at least one example embodiment, the electrical heating element is arranged upstream of the SCR catalyst in order to improve the performance of the SCR catalyst. For example, the electrical heating element is arranged within 0.5-2.5 m of the SCR catalyst, the distance being the flow path distance between the electrical heating element and the SCR catalyst.

According to at least one example embodiment, the electrical heating element is arranged downstream of the emission reducing module and upstream of the SCR catalyst.

Such arrangement of the electrical heating element is beneficial for improving the performance of the SCR catalyst, as well as being easily accessible upon removal of the service lid. According to at least one example embodiment, the electrical heating element is arranged downstream of the emission reducing module and upstream of the injector. Such arrangement of the electrical heating element is beneficial for heating the injected reductant, as well as being easily accessible upon removal of the service lid.

According to at least one example embodiment, the SCR catalyst is arranged downstream of the emission reducing module. The SCR catalyst is configured to convert nitrogen oxides, NOx, with the aid of a catalyst into diatomic nitrogen, N, and water and/or carbon dioxide, CO2. During use, the injected reductant (or the resulting ammonia) is reacted onto the catalyst.

According to at least one example embodiment, the electrical heating element is configured to keep the temperature downstream of the electrical heating element and upstream of the SCR catalyst above 180° C.

Hereby, fouling caused by the injected reductant can be reduced or even omitted.

For example, the electrical heating element is configured to keep the temperature of the exhaust gases flowing in the fluid pathway downstream of the electrical heating element and upstream of the SCR catalyst above 180° C., the temperature being e.g. measured as a mean temperature over a certain distance. The electrical heating element may be configured to keep said temperature between 180° C. and 300° C. Additionality, or alternatively, the electrical heating element is configured to keep the temperature in the SCR catalyst between 180° C. and 300° C.

According to at least one example embodiment, the electrical heating element is controlled to initiate heating of the exhaust gases in response to a measured temperature upstream of the electrical heating element (and e.g. downstream of the emission reducing module), of below 180° C. The electrical heating element may be further controlled to terminate heating of the exhaust gases in response to a measured temperature upstream of the electrical heating element (and e.g. downstream of the emission reducing module), of above 200° C., or in response to a measured temperature downstream of the electrical heating element (and e.g. upstream of the SCR catalyst), of above 300° C. According to at least one example embodiment, the electrical heating element is controlled to initiate heating of the exhaust gases in response to a measured temperature of the SCR catalyst below 200° C., or below 180° C.

According to at least one example embodiment, the electrical heating element is configured to adapt the temperature downstream of the electrical heating element and upstream of the SCR catalyst at least based on the temperature of the injected reductant.

Hereby, the temperature of the reductant can be included in the controlling of the electrical heating element.

According to at least one example embodiment, the operating power of the electrical heating element is between 300 W and 15000 W, or between 1000 W and 15000 W. According to at least one example embodiment, the operating voltage of the electrical heating element is 12V, 24V or 48V.

According to at least one example embodiment, the exhaust aftertreatment unit further comprises a secondary catalyst, wherein the secondary catalyst is arranged to be removable through the service opening of the casing upon removal of the service lid.

Hereby, the service lid may combine the function of being a service lid for both the electrical heating element, the emission reducing module and the secondary catalyst. According to at least one example embodiment, the secondary catalyst is arranged upstream of the emission reducing module. The secondary catalyst may e.g. be a secondary SCR catalyst. According to at least one example embodiment, the service lid is removably arranged to the casing by a removable fastener, such as e.g. a clamp.

Hereby, a simple yet effective means for removably arranging the service lid to the casing is provided.

According to a second aspect of the invention, a method for handling an exhaust aftertreatment unit for a vehicle is provided. The exhaust aftertreatment unit comprises an emission reducing module being a DPF and/or a DOC, a selective catalyst reduction, SCR, catalyst, an electrical heating element arranged upstream of the SCR catalyst, a casing housing at least the emission reducing module, and a service lid removably arranged to cover a service opening of the casing through which the emission reducing module may be accessed. The method comprising:
  removing the service lid for accessing the electrical heating element,
  removing the electrical heating element relative the casing.

Hereby, the electrical heating element is made easily accessible and may be removed from the casing for maintenance and/or exchange. According to at least one example embodiment, the method comprises performing maintenance of the electrical heating element or exchanging the electrical heating element. Thus, the method may be referred to as a method for servicing the exhaust aftertreatment unit. The electrical heating element may be removably arranged relative the casing and is arranged accessible upon removal of the service lid, through e.g. the service opening or an orifice of the service lid. As described with reference to the first aspect of the invention, the casing may be arranged to house the electrical heating element, or the service lid may be arranged to house the electrical heating element.

According to at least one example embodiment, the exhaust aftertreatment unit being subject to the method of the second aspect of invention is the same exhaust aftertreatment unit described in the first aspect of the invention. Thus, effects and features of the exhaust aftertreatment unit in the second aspect of the invention are largely analogous to those described above in connection with the first aspect of the invention. Embodiments mentioned in relation to the first aspect of the invention are largely compatible with the exhaust aftertreatment unit in the second aspect of the invention.

According to at least one example embodiment, the electrical heating element is removed relative the casing by being passed through the service opening.

According to at least one example embodiment, the electrical heating element is attached to the service lid, and the step of removing the service lid and the step of removing the electrical heating element is carried out simultaneously.

Hereby, a simple yet effective way of removing the electrical heating element relative the casing is provided. Thus, the service lid is removably arranged relative the casing together with the electrical heating element, and the electrical heating element may be removed relative the casing upon the removal of the service lid.

According to at least one example embodiment, the electrical heating element is attached to the emission reducing module, and the step of removing the electrical heating element is carried out subsequently to the step of removing the service lid, wherein the method further comprises the step of removing the emission reducing module relative the casing simultaneously with the step of removing the electrical heating element.

Hereby, another simple yet effective way of removing the electrical heating element relative the casing is provided. Thus, the emission reducing module is removably arranged relative the casing together with the electrical heating element, and the electrical heating element may be removed relative the casing upon the removal of the emission reducing module. For example, the emission reducing module is a DPF, and the electrical heating element may be removed relative the casing together with the DPF.

According to at least one example embodiment, the electrical heating element is configured to be powered via an electrical connection, wherein the electrical connection is extending at least through an external surface of the service lid and is releasably mounted to the service lid, wherein the method comprises detaching, or loosening, the electrical connection from the service lid before the service lid is removed from the casing. According to at least one example embodiment, the electrical connection may comprise a threaded section configured to be threadedly connected to a corresponding threaded section of the service lid.

According to at least one example embodiment, the method further comprises the steps of:
  attaching the electrical heating element relative the casing, and
  attaching the service lid to the casing.

Hereby, the serviced or maintained electrical heating element may be removably attached to the casing again, or a new electrical heating element replacing the old electrical heating element may be removably attached to the casing. The step of attaching the electrical heating element relative the casing may comprise inserting the electrical heating element into the casing by passing the electrical heating element through the service opening, or in case the electrical heating element is integrated or housed in the service lid, simply by attaching the service lid to the casing. Thus, the service lid is attached to the casing subsequently or simultaneously with the step of attaching the electrical heating element relative the casing. Typically, the service lid is attached to the casing by covering the service opening. For embodiments in which the electrical heating element is housed by the service lid, the step of attaching the electrical heating element may comprise inserting the electrical heating element into the service lid.

According to at least one example embodiment, the exhaust aftertreatment unit comprises an injector configured to inject a reductant for providing ammonia to the SCR, the injector being arranged in the service lid, and the method further comprises:

removing the injector relative the casing.

Hereby, also the injector may be removed from the casing and be subject to maintenance or exchange.

According to at least one example embodiment, the exhaust aftertreatment unit comprises a secondary catalyst, and the method further comprises:

removing the secondary catalyst through the service opening of the casing subsequently to the step of removing the service lid.

Thus, the secondary catalyst may be subject to maintenance or be exchanged. Embodiments of the secondary catalyst was described with reference to the first aspect of the invention, and is not repeated again.

According to a third aspect of the invention, an electrical heating element for use in exhaust aftertreatment unit in accordance with the first aspect of the invention is provided.

Effects and features of the third aspect of the invention are largely analogous to those described above in connection with the first aspect of the invention. Embodiments mentioned in relation to the first aspect of the invention are largely compatible with the third aspect of the invention.

Thus, the exhaust aftertreatment unit comprises an emission reducing module being a DPF and/or a DOC, a selective catalyst reduction, SCR, catalyst, a casing housing at least the emission reducing module, and a service lid removably arranged to cover a service opening of the casing through which the emission reducing module may be accessed. The electrical heating element is removably attachable to the exhaust aftertreatment unit, and may e.g. be passed through the service opening and removably arranged inside the casing, or may be removably arranged inside the service lid. Typically, the electrical heating element is sized and dimensioned for arrangement upstream of the SCR catalyst, and upstream of any injector comprised in the exhaust aftertreatment unit.

According to a fourth aspect of the invention, use of an electrical heating element in exhaust aftertreatment unit in accordance with the first aspect of the invention is provided.

Effects and features of the fourth aspect of the invention are largely analogous to those described above in connection with the first, second and third aspects of the invention. Embodiments mentioned in relation to the first, second and third aspects of the invention are largely compatible with the fourth aspect of the invention.

According to a fifth aspect of the invention, a service lid comprising an electrical heating element for use in exhaust aftertreatment unit in accordance with the first aspect of the invention is provided.

Thus, the electrical heating element is attached to the service lid as described in accordance with the first aspect of the invention. The electrical heating element may be housed by the service lid, or may be arranged to extend out from the service lid.

Effects and features of the fifth aspect of the invention are largely analogous to those described above in connection with the first aspect of the invention, at least related to the service lid and the electrical heating element. Embodiments mentioned in relation to the first aspect of the invention are largely compatible with the fifth aspect of the invention, at least related to the service lid and the electrical heating element.

According to a sixth aspect of the invention, a vehicle comprising an exhaust aftertreatment unit in accordance with the first aspect of the invention is provided.

Effects and features of the sixth aspect of the invention are largely analogous to those described above in connection with the first aspect of the invention. Embodiments mentioned in relation to the first aspect of the invention are largely compatible with the sixth aspect of the invention.

The order of the method steps described in the second aspect of the invention is not constrained to that described in the present disclosure. One or several of the steps could switch places, or occur in a different order, unless explicitly stated so without departing from the scope of the invention. However, according to at least one example embodiment, the method steps are performed in the order described in the second aspect of the invention.

Further advantages and features of the present disclosure are disclosed and discussed in the following description and the accompanying drawings.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
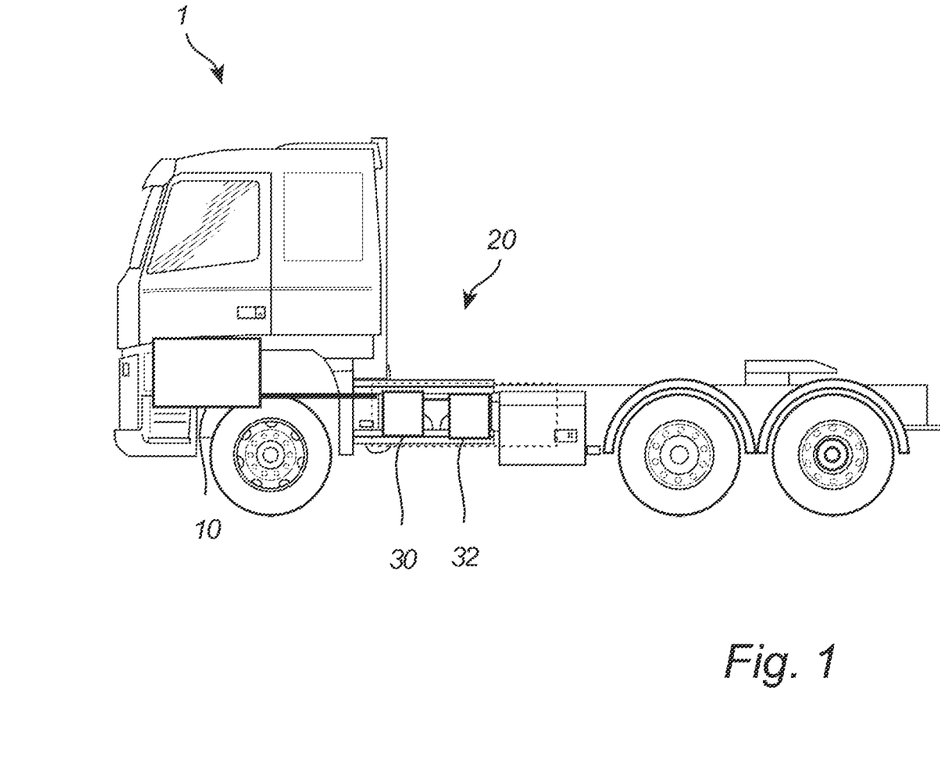
FIG. 1 is a schematic side view of a vehicle comprising an exhaust aftertreatment unit in accordance with an example embodiment of the invention.

With reference to FIG. 1 a vehicle 1, here embodied as a heavy duty truck 1 for which an exhaust aftertreatment unit 20 of a kind disclosed in the present disclosure is advantageous. However, the exhaust aftertreatment unit 20 may as well be implemented in other types of vehicles, such as in busses, light-weight trucks, passenger cars, marine applications etc. The vehicle 1 of FIG. 1 comprises an engine 10, being a diesel engine 10, but the vehicle may according to at least one example embodiment be a hybrid vehicle further comprising an electric machine (not shown). The diesel engine 10 is powered by diesel fuel, typically comprised in a fuel tank, and any electric machine is typically powered by electricity supplied from at least one energy storage or transformation device, e.g. a battery or a fuel cell.

In FIG. 1, the vehicle 1 comprises an exhaust aftertreatment unit 20 for cleaning exhaust gases from at least the diesel engine 10. The exhaust aftertreatment unit 20 comprises at least an emission reducing module 30 being a DPF and/or a DOC, and a selective catalyst reduction catalyst 32, hereafter referred to as a SCR catalyst 32 arranged downstream of the emission reducing module 30. The emission reducing module 30 is arranged and configured to remove particles, i.e. diesel particulate matter or soot, from the exhaust gas of the diesel engine 10 and/or is arranged and configured to convert carbon monoxide and hydrocarbons into carbon dioxide. The SCR catalyst 32 is arranged and configured to convert nitrogen oxides, also referred to as NOx, with the aid of a catalyst, into diatomic nitrogen, N2, and water and/or carbon dioxide CO2. A reductant, typically anhydrous ammonia, aqueous ammonia, urea, aqueous urea or a diesel exhaust fluid solution is added to the engine exhaust gases and is absorbed onto the catalyst in the SCR catalyst 32. The exhaust aftertreatment unit 20 may be comprised in an exhaust aftertreatment system of the vehicle, the exhaust aftertreatment system comprising further components such as e.g. piping and other emission reducing components.

Figure 2:
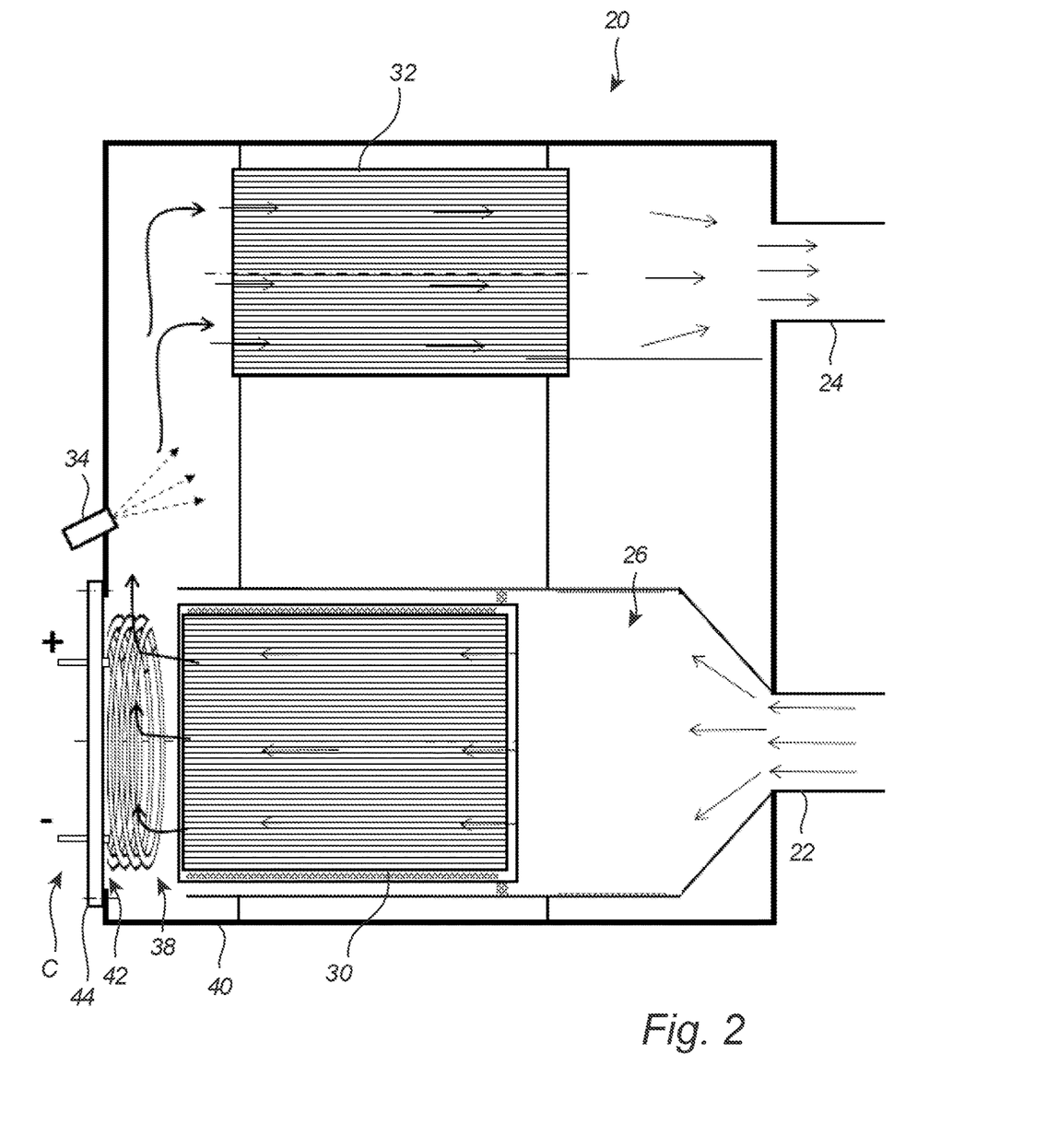
FIG. 2 is a schematic cross sectional view of an exhaust aftertreatment unit in accordance with an example embodiment of the invention.

In FIG. 2, the exhaust aftertreatment unit 20 of FIG. 1 is shown in greater detail. The exhaust aftertreatment unit 20 comprises an inlet 22 for receiving the exhaust gases, an outlet 24 for discharging at least partly cleaned exhaust gases from the exhaust aftertreatment unit 20, and a fluid pathway 26 for transporting the exhaust gases from the inlet 22 to the outlet 24. The exhaust aftertreatment unit 20 further comprises an emission reducing module 30 being a diesel particulate filter, DPF and/or a diesel oxidation catalyst, DOC, and an SCR catalyst 32, arranged downstream of the emission reducing module 30. Moreover, in order provide ammonia to the SCR catalyst 32, the exhaust aftertreatment unit 20 comprises an injector 34 for injecting a reductant, as previously described. The reductant may e.g. be urea. The exhaust aftertreatment unit 20 further comprises an electrical heating element 38 arranged upstream of the SCR catalyst 32, and in FIG. 2 also upstream of the injector 34. In FIG. 2, the emission reducing module 30, the SCR catalyst 32 and the electrical heating element 38 are housed in a casing 40.

The exhaust aftertreatment unit 20 is typically operated in the following manner: exhaust gases (to be cleaned) from the diesel engine enters the exhaust aftertreatment unit 20 via the inlet 22, and is passed through the emission reducing module 30 for e.g. particulate removal. Thereafter the exhaust gases encounter the electrical heating element 38 and is heated. The heated exhaust gases continue along the fluid pathway 26 to a position in which the urea is injected by injector 34. The injected reductant is thus mixed with the heated exhaust gases and the heat provided by the electrical heating element 38 is sufficient for evaporating and hydrolizing the urea into ammonia. The ammonia and exhaust gases thereafter enter the SCR catalyst 32 for catalytic reduction of the NOx, whereafter the cleaned exhaust gases are discharged from the exhaust aftertreatment unit 20 via the outlet 22.

For various reasons, accessibility of the emission reducing module 30 and/or the electrical heating element 38 is desirable. Thus, the casing 40 comprises a service opening 42 through which at least the emission reducing module 30 may be accessed and possibly passed (if removed from the casing 40). Thus, the emission reducing module 30 may be removed from the casing 40 for maintenance or exchange, and/or may be inserted into the casing 40 for installation. The service opening 42 is closable by means of a removably arranged service lid 44. In other words, the service lid 44 is removably arranged to cover the service opening 42. Stated differently, the service lid 44 is a separate component relative the casing 40, and is removably arranged relative the casing 40.

The electrical heating element 38 is removably arranged relative the casing 40, and is in FIG. 2 arranged inside the casing 40 in such a way that it is accessible through the service opening 42 upon removal of the service lid 44. Thus, the electrical heating element 38 may be removed from the casing 40 and exchanged and/or be subject to maintenance.

Figure 3A:
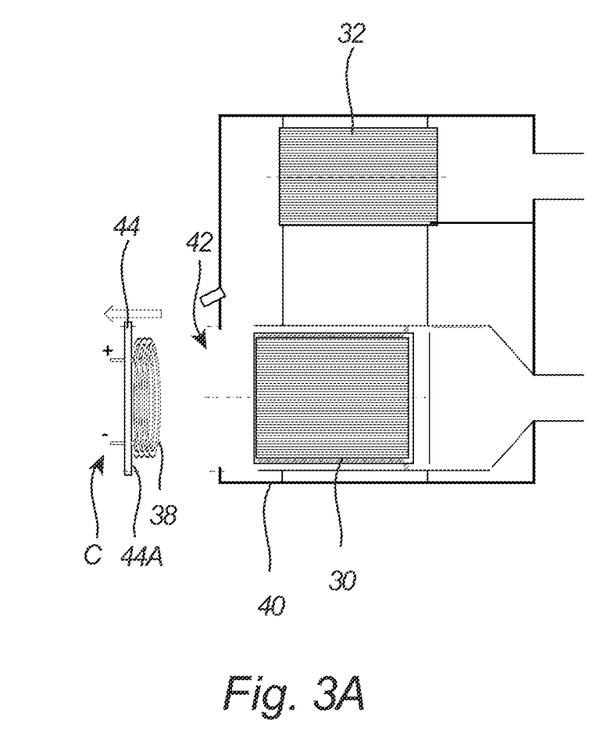
FIGS. 3A-3B shows a schematic example of how the electrical heating element is attached to the service lid, and is removed from the casing, applicable to example embodiments of the invention.
Figure 3B:
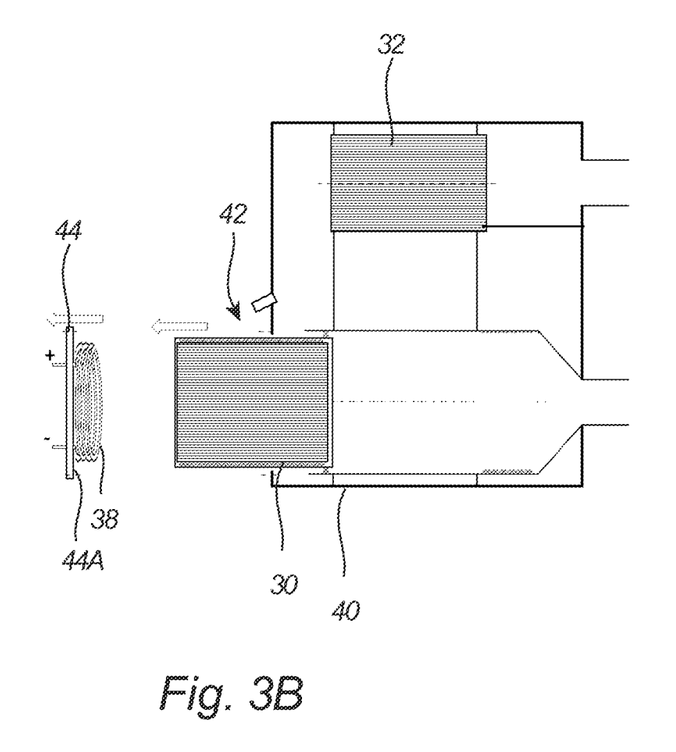

A procedure of handling the exhaust aftertreatment unit 20 of FIG. 2, will now briefly be described with reference to FIGS. 3A-3B. The method may be referred to as a method for accessing the electrical heating element 38 in the casing 40. In the embodiment of FIGS. 3A-3B, the electrical heating element 38 is attached to the service lid 44, and is thus removably arranged relative the casing 40 together with the service lid 44. In more detail, the service lid 44 comprises a first external surface 44A arranged to face the fluid pathway 26 when the service lid 44 is arranged to close the service opening 42, wherein the electrical heating element 38 is attached to the first external surface 44A of the service lid 44. The service lid 44 in FIGS. 3A-3B furthermore comprises a second external surface arranged opposite the first external surface 44A, and thus arranged to face away from the casing 40 when the service lid 44 is arranged to close the service opening 42.

First, as shown in FIG. 3A, the service lid 44 is removed together with the electrical heating element 38 from the casing 40. That is, the electrical heating element 38 is removed relative the casing 40 via the service opening 42 simultaneously with the removal of the service lid 44. Hereby, the electrical heating element 38 is made accessible for e.g. maintenance or exchange. Thereafter, as shown in FIG. 3B, the emission reducing module 30 is passed through the service opening 42 by being removed from the casing 40. Hereby, the emission reducing module 30 is made accessible for e.g. maintenance or exchange.

Figure 4A:
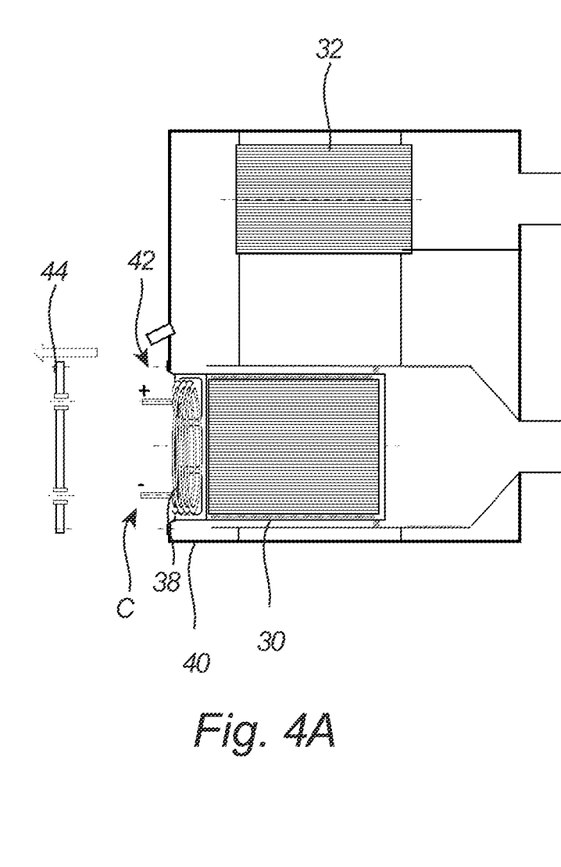
FIGS. 4A-4B shows a schematic example of how the electrical heating element is attached to the emission reducing module, and is removed from the casing, applicable to example embodiments of the invention.
Figure 4B:
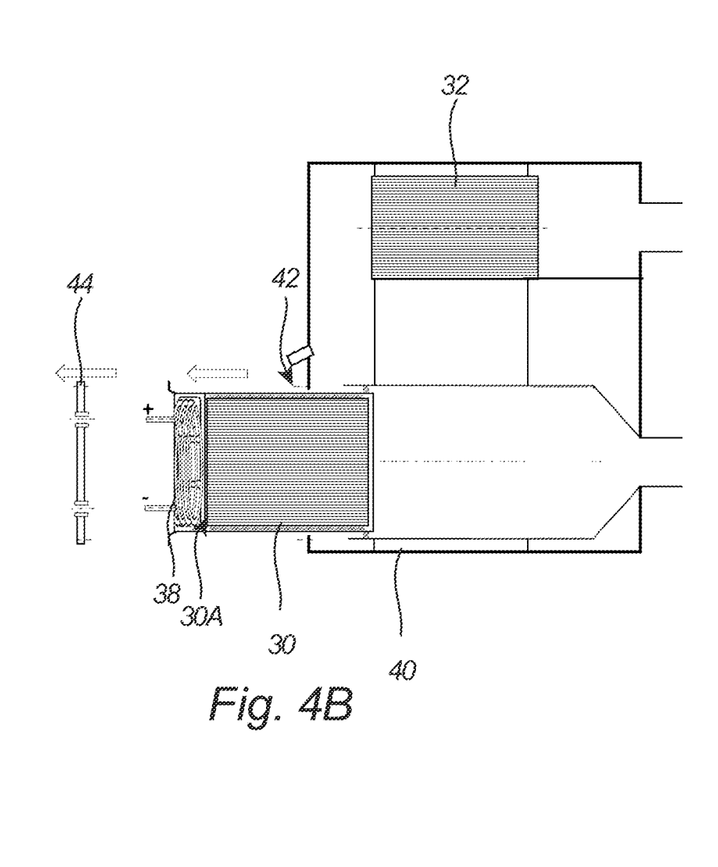

In another embodiment shown in FIGS. 4A-4B, the electrical heating element 38 is attached to the emission reducing module 30 and is removably arranged relative the casing 40 together with the emission reducing module 30. In more detail, the emission reducing module 30 comprises a first end portion 30A (or downstream facing surface) facing downstream of the fluid pathway 26, wherein the electrical heating element 38 is attached to the first end portion 30A of the emission reducing module 30.

First, as shown in FIG. 4A, the service lid 44 is removed from the casing 40. Hereby, the electrical heating element 38 is made accessible for e.g. maintenance or exchange. That is, the electrical heating element 38 may be subject to maintenance via the service opening 42, and/or may be detached from the emission reducing module 30, prior to removing the latter from the casing 40. Thereafter, as shown in FIG. 4B, the emission reducing module 30 may be passed through the service opening 42 together with the electrical heating element 38 and thereby removed from the casing 40. That is, the electrical heating element 38 is removed relative the casing 40 via the service opening 42 simultaneously with the removal of the emission reducing module 30. Hereby, the emission reducing module 30, together with the electrical heating element 38, are made easily accessible for e.g. maintenance or exchange.

Figure 5:
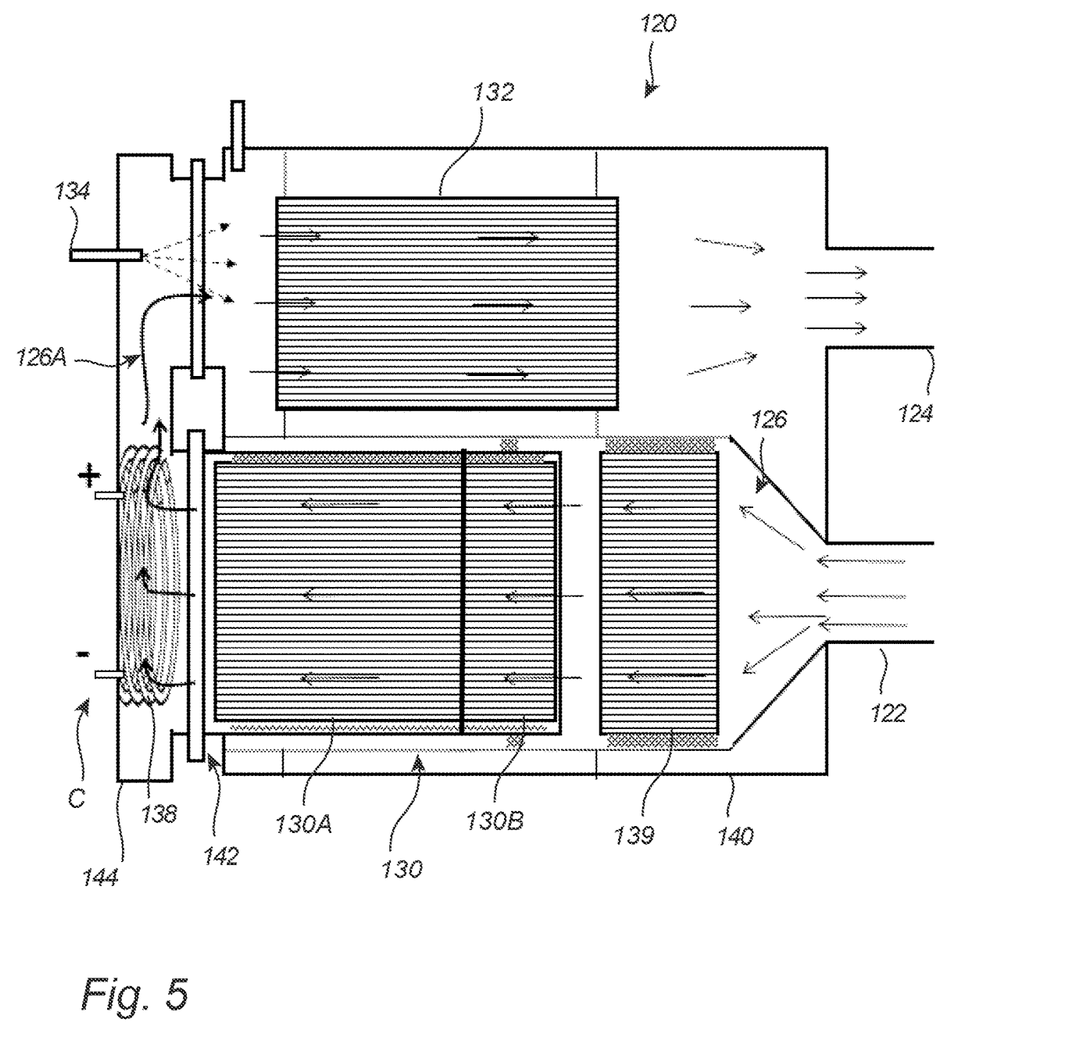
FIG. 5 is a schematic cross sectional view of an exhaust aftertreatment unit in accordance with an example embodiment of the invention.

In FIG. 5, an alternative embodiment of the exhaust aftertreatment unit 120 is shown. The exhaust aftertreatment unit 120 comprises an inlet 122, an outlet 124, a flow path 126 for the exhaust gases from the inlet 122 to the outlet 124, a reducing emission module 130, an SCR catalyst 132, an injector 134 and an electrical heating element 138 in a corresponding manner as in the embodiment of FIG. 2, and is thus not described in full again. For the embodiment of FIG. 5, the emission reducing module 130 comprises a DPF 130A and a DOC 130B, and the exhaust aftertreatment unit 120 further comprises a secondary catalyst 139 arranged upstream of the emission reducing module 130, the secondary catalyst 139 here being a secondary SCR 139. The emission reducing module 130, the SCR catalyst 132 and the secondary catalyst 139 are housed in a casing 140. It should be noted as the emission reducing module 130 may be a DPF 130A and/or a DOC 130B, either one of the DPF 130A and DOC 130B may be omitted from the emission reducing module 130 in FIG. 5.

The casing 140 comprises a service opening 142 through which at least the emission reducing module 130 may be accessed and possibly passed (if removed from the casing 140). The service opening 142 is closable by means of a removably arranged service lid 144 which is removably arranged to cover the service opening 142. In the embodiment of FIG. 5, the injector 134 and the electrical heating element 138 are arranged in the service lid 144. Stated differently, the service lid houses the electrical heating element 138 and the injector 134. According to at least one example embodiment, only one of the electrical heating element 138 and the injector 134 is housed in the service lid 144, e.g. only the electrical heating element 138 is arranged in the service lid 144, and the injector 134 is arranged inside the casing 140. Moreover, the service lid 144 comprises a fluid channel portion 126A defining at least a portion of the fluid pathway 126 of the exhaust gases flowing through the exhaust aftertreatment unit 120, the fluid channel portion 126A extending at least from the electrical heating element 138 to the injector 134. That is, the electrical heating element 138 may be arranged in the fluid channel portion 126A. Thus, during service or maintenance of the exhaust aftertreatment unit 120, the service lid 144 is removed together with the electrical heating element 138 and the injector 134 from the casing 140. That is, the electrical heating element 138 and the injector 134 are removed relative the casing 140 simultaneously with the removal of the service lid 144. Hereby, the electrical heating element 138, as well as the injector 134, are made accessible for e.g. maintenance or exchange, as well as the fluid channel portion 126A. Thereafter, the emission reducing module 130 may be removed from the casing 140 through the service opening 142, and made accessible for e.g. maintenance or exchange. Subsequently, as the secondary catalyst 139 are arranged upstream of the emission reducing module 130, the secondary catalyst 139 may be removed from the casing 140 through the service opening 142.

It should be noted that the secondary catalyst 139 and the service lid 142 comprising the injector 134 and/or the electrical heating element 138, are structurally and functionally separated from each other. Thus, the exhaust aftertreatment unit 120 of FIG. 5 may optionally be equipment with the secondary catalyst 139, and/or the service lid 144 comprising the injector 134 and/or the electrical heating element 138. Correspondingly, the exhaust aftertreatment unit 20 of FIG. 2 may be equipment with the secondary catalyst 139, and/or have a service lid comprising the injector and/or the electrical heating element. Moreover, the DPF 130A and the DOC 130B are structurally and functionally separated from each other, and may be combined as a DPF/DOC in the emission reducing module 130, or may be comprised in the emission reducing module 30 without the inclusion of the other.

Applicable to both the exhaust aftertreatment unit 20 of FIGS. 2, 3A-3B and 4A-4B, and the exhaust aftertreatment unit 120 of FIG. 5, the electrical heating element 38, 138 may be powered via an electrical connection C integrated into the service lid 44, 144 by extending through at least one external surface of the service lid 44, 144. The electrical connection C may e.g. extend through the service lid 44, as for the exhaust aftertreatment unit 20, or extend through at least one external surface of the service lid 144, as for the exhaust aftertreatment unit 120. Preferably, in the embodiment shown in FIGS. 4A-4B, in which the electrical heating element 38 is attached to the emission reducing module 30, the electrical connection C is releasably mounted to the service lid 44, e.g. by a threaded connection. Hereby, the service lid 44 may be detached from the electrical connection C, and removed from the casing 40, prior to removing electrical heating element 38.

Moreover, applicable to both the exhaust aftertreatment unit 20 of FIGS. 2, 3A-3B and 4A-4B, and the exhaust aftertreatment unit 120 of FIG. 5, the electrical heating element 38, 138 may be configured to be powered to keep the temperature downstream of the electrical heating element 38, 138 and upstream of the SCR catalyst above 180° C. For example, the operating power of the electrical heating element 38, 138 may be between 300 W and 15000 W.

Figure 6:
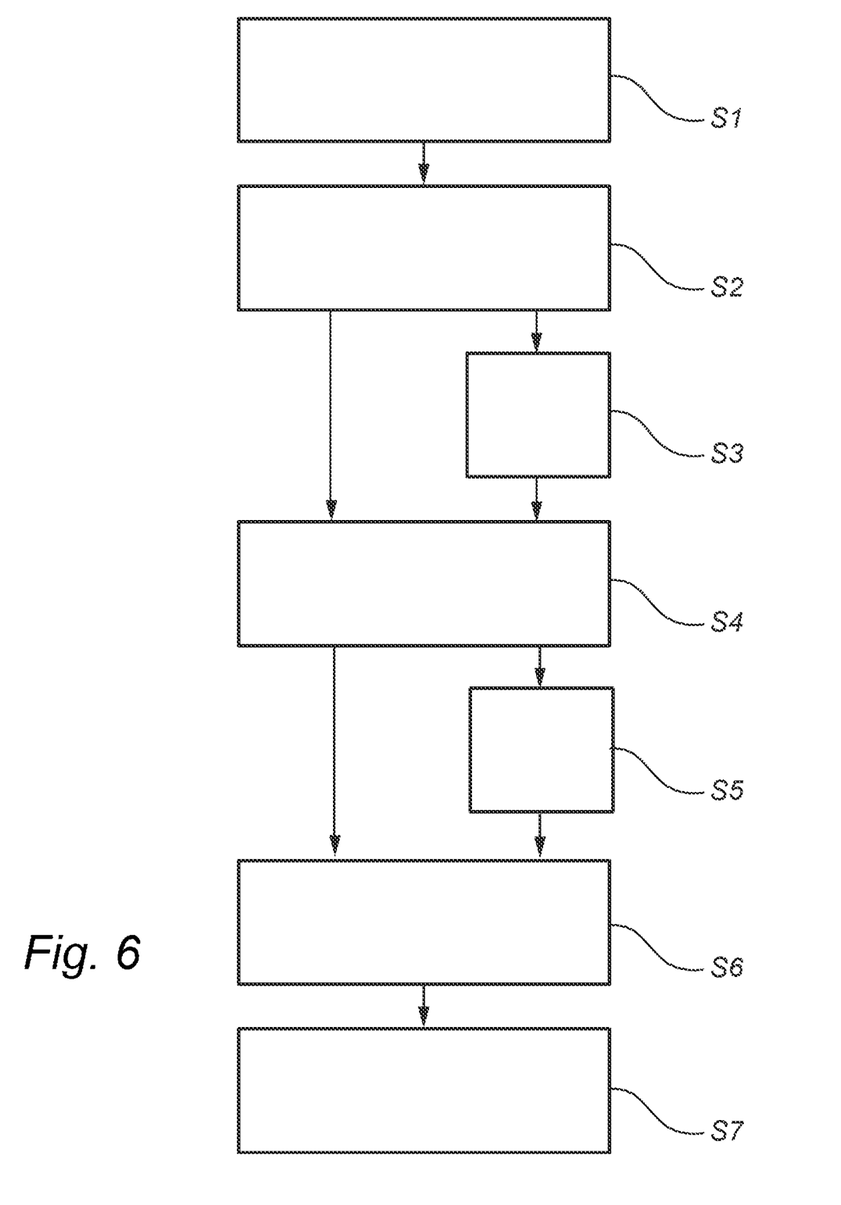
FIG. 6 is a flowchart illustrating the steps of a method in accordance with one example embodiment of the invention.

Turning to the flowchart of FIG. 6, schematically illustrating steps of a method for handling, or servicing, an exhaust aftertreatment unit for a vehicle, such as the exhaust aftertreatment unit 20 of FIGS. 2, 3A-3B and 4A-4B, and the exhaust aftertreatment unit 120 of FIG. 5. Thus, the exhaust aftertreatment unit comprises an emission reducing module being a DPF and/or a DOC, an SCR catalyst arranged downstream of the emission reducing module, an electrical heating element arranged upstream of the SCR catalyst, a casing housing at least the emission reducing module, and a service lid removably arranged to cover a service opening of the casing through which the emission reducing module may be accessed.

In a step S1, the service lid is removed for accessing the electrical heating element.

In a step S2, the electrical heating element is removed relative the casing.

The step S1 may e.g. be a first step S1 as shown in FIGS. 4A-4B, in which the service lid is removed prior to the step S2 of removing the electrical heating element, the latter thus being a second step S2. Alternatively, the step S1 and the step S2 are carried out simultaneously as shown in FIGS. 3A-3B, in which the service lid is removed together with the electrical heating element, as the electrical heating element is attached to the service lid.

In an optional step S3, applicable for the exhaust aftertreatment unit 120 of FIG. 5, in which the injector is arranged in the service lid, the injector is removed relative the casing. Thus, the step S1, the step S2 of removing the service lid and removing the electrical heating element, and the optional step S3 are carried out simultaneously as the service lid is removed together with the electrical heating element and the injector, as the electrical heating element and the injector is attached to the service lid.

In an optional step S4, the emission reducing module is removed through the service opening. For the embodiment shown in FIGS. 4A-4B, the optional step S4 is performed together with the second step S2 of removing the electrical heating element, as the electrical heating element is attached to the emission reducing module. For the embodiment shown in FIGS. 3A-3B, the optional step S4 is performed subsequent to the steps S1, S2 of removing the service lid and removing the electrical heating element, and for the embodiment shown in FIG. 5, the optional step S4 is performed subsequent to the steps S1, S2, S3 of removing the service lid and removing the electrical heating element.

In an optional step S5, applicable for an exhaust aftertreatment unit comprising a secondary catalyst 139, such as the exhaust aftertreatment unit 120 of FIG. 5, the secondary catalyst is removed through the service opening of the casing subsequently to at least the step S1 of removing the service lid.

In an optional step S6, the electrical heating element is attached, or is re-attached, relative the casing. Such optional step S6 is thus preformed subsequent to at least the step S2 of removing the electrical heating element. For example, the electrical heating element may be inserted into the casing, applicable for embodiments in which the electrical heating element is arranged inside the casing, e.g. as in FIGS. 3A-3B and 4A-4B. Alternatively, the electrical heating element may be inserted into the service lid, applicable to embodiments in which the electrical heating element is housed in the service lid, e.g. as in FIG. 5.

In an optional step S7, the service lid is attached to the casing. For the embodiments shown in FIGS. 3A-3B and FIG. 5, the optional step S7 is performed simultaneously with the optional step S6. For the embodiments shown in FIG. 4A-4B, the optional step S7 is performed subsequent to the optional step S6.

It is to be understood that the present invention is not limited to the embodiments described above and illustrated in the drawings; rather, the skilled person will recognize that many changes and modifications may be made within the scope of the appended claims. For example, the exhaust aftertreatment unit may be used for cleaning exhaust gases of other engines than diesel engines. For example, the present exhaust aftertreatment unit may be used to clean exhaust gases, e.g. by converting NOx emissions, from the exhaust of internal combustion engines based on CNG (Compressed Natural Gas), LPG (Liquified Pressurized Gas), DME (DiMethylEther), and/or H2 (Hydrogen).

Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. An exhaust aftertreatment unit for cleaning exhaust gases, the exhaust aftertreatment unit comprising:
   an emission reducing module being a diesel particulate filter, DPF, and/or a diesel oxidation catalyst, DOC,
   a selective catalyst reduction, SCR, catalyst,
   an electrical heating element arranged downstream of the emission reducing module and upstream of the SCR catalyst,
   a casing housing at least the emission reducing module, and
   a service lid removably arranged to cover a service opening of the casing through which the emission reducing module may be accessed,
   wherein the electrical heating element is removably arranged relative the casing and is arranged accessible upon removal of the service lid.

2. The exhaust aftertreatment unit according to claim 1, further comprising an injector configured to inject a reductant for providing ammonia to the SCR catalyst, wherein the electrical heating element is arranged upstream of the injector.

3. The exhaust aftertreatment unit according to claim 2, wherein the injector is attached to the service lid.

4. The exhaust aftertreatment unit according to claim 1, wherein the electrical heating element is attached to the service lid and is removably arranged relative the casing together with the service lid, or is attached to the emission reducing module and is removably arranged relative the casing together with the emission reducing module.

5. The exhaust aftertreatment unit according to claim 4, for which the electrical heating element is attached to the service lid, and wherein the service lid comprises a fluid channel portion defining at least a portion of the fluid pathway of the exhaust gases flowing through the exhaust aftertreatment unit.

6. The exhaust aftertreatment unit according to claim 1, wherein the electrical heating element is configured to be powered via an electrical connection, wherein the electrical connection is extending at least through an external surface of the service lid.

7. The exhaust aftertreatment unit according to claim 1, comprising a secondary catalyst, wherein the secondary catalyst is arranged to be removable through the service opening of the casing upon removal of the service lid.

8. The exhaust aftertreatment unit according to claim 1, wherein the electrical heating element is configured to keep the temperature downstream of the electrical heating element and upstream of the SCR catalyst above 180° C.

9. An electrical heating element for use in the exhaust aftertreatment unit according to claim 1.

10. A vehicle comprising the exhaust aftertreatment unit according to claim 1.

11. A method for handling an exhaust aftertreatment unit for a vehicle, the exhaust aftertreatment unit comprising an emission reducing module being a DPF and/or a DOC, a selective catalyst reduction, SCR, catalyst, an electrical heating element arranged downstream of the emission reducing module and upstream of the SCR catalyst, a casing housing at least the emission reducing module and the electrical heating element, and a service lid removably arranged to cover a service opening of the casing through which the emission reducing module may be accessed, the method comprising:
   removing the service lid for accessing the electrical heating element,
   removing the electrical heating element relative the casing.

12. The method according to claim 11, wherein the electrical heating element is attached to the service lid, and the removing the service lid and the removing the electrical heating element is carried out simultaneously.

13. The method according to claim 11, wherein the electrical heating element is attached to the emission reducing module, and the removing the electrical heating element is carried out subsequently to the removing the service lid, and wherein the method further comprises the removing the emission reducing module relative the casing simultaneously with the removing the electrical heating element.

14. The method according to claim 11, further comprising:
   attaching the electrical heating element relative the casing, and
   attaching the service lid to the casing.

* * * * *